April 20, 1926.

W. LONG

BOLT LOCK

Filed August 31, 1925

Inventor
Walter Long
By Clarence A. O'Brien
Attorney

Patented Apr. 20, 1926.

1,581,216

UNITED STATES PATENT OFFICE.

WALTER LONG, OF HARRISBURG, OREGON.

BOLT LOCK.

Application filed August 31, 1925. Serial No. 53,706.

*To all whom it may concern:*

Be it known that I, WALTER LONG, a citizen of the United States, residing at Harrisburg, in the county of Linn and State of Oregon, have invented certain new and useful Improvements in a Bolt Lock, of which the following is a specification.

This invention relates to improvements in bolt locks, and has for its principal object to provide a highly novel and simple device for locking a bolt after the same has been placed through the members which are to be secured together.

One of the important objects of the present invention is to provide a bolt lock which includes a cylindrical casing having its inner end closed, the latter being provided with a threaded opening through which the threaded shank of the bolt is adapted to extend, means being provided for locking the cylindrical casing against rotation on the bolt, additional means being provided for locking the outer end of the casing to prevent access to the first mentioned locking means.

A further object is to provide a bolt lock of the above mentioned character which may be readily and easily operated, the same being further positive and efficient in locking the bolt against accidental displacement.

A still further object is to provide a bolt lock of the above mentioned character which is simple in construction, inexpensive, strong and durable and further well adapted to the purpose for which it is designed.

Other objects and advantages of the invention will become apparent during the course of the following description taken in connection with the accompanying drawing.

In the accompanying drawing forming a part of this application and in which like numerals designate like parts throughout the same:

Figure 1:
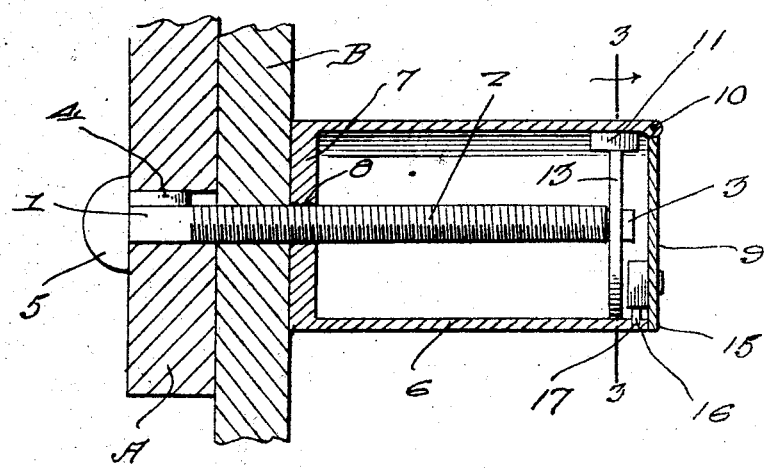
Figure 1 is a longitudinal sectional view through the cylindrical casing showing the manner in which the same is disposed over the shank and outer end of the bolt for locking the same.
Figure 2:
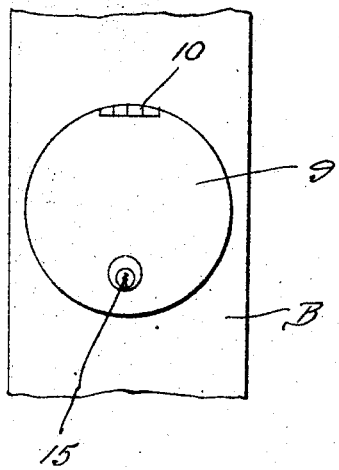
Figure 2 is an end elevation illustrating the hinged closure for the outer end of the cylindrical casing.

In the drawing wherein for the purpose of illustration is shown the preferred embodiment of my invention, the numeral 1 designates the bolt, the shank portion of which is externally threaded for substantially the entire length thereof as indicated at 2. The outer end of the bolt is reduced as indicated at 3, and the purpose thereof will be readily apparent. A tooth or the like, such as is shown at 4, is formed on the inner end of the shank portion 2 adjacent the head 5 of the bolt, and the same is adapted to bite into the innermost of the members which is to be secured by the bolt, the head 5 engaging the outer face of the innermost member A in the manner clearly illustrated in Figure 1. The other member is to be secured, as indicated generally at B, these elments are secured together by the bolt, and the locking means therefor, the construction of the latter being presently described.

The locking means for the bolt includes a substantially cylindrical casing 6, the inner end of which is closed as illustrated at 7. The inner closed end of the cylindrical casing is provided with a central threaded opening 8 which permits the casing to be threaded onto the threaded shank 2 of the bolt 1, the outer face of the inner end 7 of the cylindrical casing being adapted to engage the outer face of the member 6 in the manner as shown more clearly in Figure 1. The cylindrical casing 6 provides what may be termed as a nut. The outer end of the cylindrical casing is open, and associated therewith is the hinged closure 9, the hinge therefor being illustrated at 10, the purpose of this closure will also hereinafter be more fully described.

Figure 3:
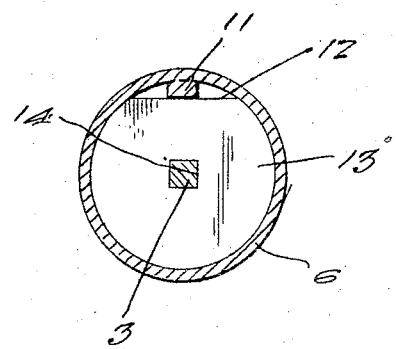
Figure 3 is a sectional view taken approximately on line 3—3 of Figure 1.

A shoulder or lug 11 is arranged on the inner wall of the cylindrical casing 6 adjacent the outer end thereof and this shoulder or lug cooperates with the flat face 12 of a suitable washer 13 which is disposed over the reduced end 3 of the bolt and the cylindrical casing has been threaded onto the bolt to its innermost position, for holding and locking the cylindrical casing against further rotation in either direction. As is illustrated more clearly in Figure 3, the reduced portion 3 is substantially rectangular in cross section, and the opening 14 formed in the washer 13 is also of the same shape so that the washer cannot rotate on the outer end of the bolt.

As illustrated in Figure 1, the outer reduced end 3 of the bolt 2 as well as the lug 11 and the washer 13 are spaced from the outer end of the cylindrical casing after the latter has been positioned on the bolt and for the purpose of preventing access to the washer, a suitable lock 15, of the key controlled type carried by the hinged closure 9, and the bolt 16 of this lock is adapted to be disposed within a suitable recess 17 provided therefor in the inner wall of the cylindrical casing 6 adjacent the outer end thereof. In this manner, the cylindrical casing will be securely locked on the bolt and thereby prevent the accidental displacement or removal of the bolt from the members A and B, as well as from the casing.

In order to remove the bolt, the proper key is inserted in the lock 15 for retracting the bolt 16 from the recess 17 and the closure 9 may then be swung outwardly. The space between the flat face 12 of the washer 13, and the inner wall of the cylindrical casing 6 permits a suitable tool to be inserted therein to facilitate the removal of the washer from the reduced end of the bolt, and when the washer has been disengaged from the outer reduced end of the bolt, the cylindrical casing is then free to rotate to permit the same to be removed from the threaded shank of the bolt.

The provision of a bolt lock of the above mentioned character will at all times insure the positive locking of a bolt, and furthermore the parts will not work loose, such as frequently happens with the lock nuts now generally associated with bolts. The simplicity in which the present device is constructed enables the same to be readily and easily assembled or disassembled, and will at all times be positive and efficient in carrying out the purpose for which it is designed.

While I have shown the preferred embodiment of my invention it is to be understood that minor changes in the size, shape and arrangement of parts may be resorted to without departing from the spirit of the invention and the scope of the appended claims.

Having thus described the invention, what I claim as new is:—

1. In combination with a bolt having its shank threaded, of a lock therefor comprising a cylindrical casing having its inner end closed, said inner end being provided with a threaded opening through which the threaded shank of the bolt extends, means for locking the cylindrical casing against rotation on the bolt, said means comprising a lug arranged on the inner wall of the cylindrical casing adjacent the outer end thereof, and a washer supported on the outer end of the bolt, said washer being provided with a flat face for engagement with said lug.

2. In combination with a bolt having its shank threaded for substantially its entire length, the outer end of the bolts being reduced, of a lock for the bolt comprising a cylindrical casing having its inner end closed, and its outer end open, said inner end being provided with a threaded opening through which the threaded shank of the bolt extends, means for locking the cylindrical casing against rotation on said bolt, said means comprising a lug arranged on the inner wall of the casing adjacent the outer open end thereof, a washer supported on the reduced outer end of the bolt, said washer being provided with a flat lug engaging face, and a hinged closure for the outer open end of the casing.

3. In combination with a bolt having its shank threaded for substantially its entire length, the outer end of the bolts being reduced, of a lock for the bolt comprising a cylindrical casing having its inner end closed, and its outer end open, said inner end being provided with a threaded opening through which the threaded shank of the bolt extends, means for locking the cylindrical casing against rotation on said bolt, said means comprising a lug arranged on the inner wall of the casing adjacent the outer open end thereof, a washer supported on the reduced outer end of the bolt, said washer being provided with a flat lug engaging face, a hinged closure for the outer open end of the casing, and means for locking the hinged closure.

In testimony whereof I affix my signature.

WALTER LONG.